US009063578B2

(12) United States Patent
Bailey et al.

(10) Patent No.: US 9,063,578 B2
(45) Date of Patent: Jun. 23, 2015

(54) ERGONOMIC PHYSICAL INTERACTION ZONE CURSOR MAPPING

(71) Applicant: Microsoft Corporation, Redmond, WA (US)

(72) Inventors: Richard Bailey, Seattle, WA (US); David Bastien, Kirkland, WA (US); Mark Schwesinger, Bellevue, WA (US); Emily Yang, Seattle, WA (US); Adam Smith, Sammamish, WA (US); Oscar Murillo, Redmond, WA (US); Tim Franklin, Seattle, WA (US); Jordan Andersen, Kirkland, WA (US); Christian Klein, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 147 days.

(21) Appl. No.: 13/955,229

(22) Filed: Jul. 31, 2013

(65) Prior Publication Data

US 2015/0035750 A1 Feb. 5, 2015

(51) Int. Cl.
*G06F 3/01* (2006.01)
*G06F 3/03* (2006.01)
*G06F 3/0482* (2013.01)
*G06K 9/00* (2006.01)

(52) U.S. Cl.
CPC ............. *G06F 3/017* (2013.01); *G06F 3/011* (2013.01); *G06F 3/0304* (2013.01); *G06F 3/0482* (2013.01); *G06K 9/00335* (2013.01)

(58) Field of Classification Search
CPC combination set(s) only.
See application file for complete search history.

(56) References Cited

U.S. PATENT DOCUMENTS

| 2004/0155962 A1* | 8/2004 | Marks ........................... 348/169 |
| 2008/0170123 A1* | 7/2008 | Albertson et al. ............ 348/157 |
| 2010/0208945 A1 | 8/2010 | Te Vrugt et al. |
| 2011/0193939 A1 | 8/2011 | Vassigh et al. |

(Continued)

FOREIGN PATENT DOCUMENTS

GB 2480140 A 11/2011

OTHER PUBLICATIONS

Pons-Moll, et al., "Multisensor-Fusion for 3D Full-Body Human Motion Capture", Retrieved at <<http://ieeexplore.ieee.org/stamp/stamp.jsp?tp=&arnumber=5540153>>, In IEEE Conference on Computer Vision and Pattern Recognition, Jun. 12, 2010, (8 pages total).

(Continued)

*Primary Examiner* — Charles V Hicks
(74) *Attorney, Agent, or Firm* — Aaron Chatterjee; Kate Drakos; Micky Minhas

(57) ABSTRACT

Users move their hands in a three dimensional ("3D") physical interaction zone ("PHIZ") to control a cursor in a user interface ("UI") shown on a computer-coupled 2D display such as a television or monitor. The PHIZ is shaped, sized, and positioned relative to the user to ergonomically match the user's natural range of motions so that cursor control is intuitive and comfortable over the entire region on the UI that supports cursor interaction. A motion capture system tracks the user's hand so that the user's 3D motions within the PHIZ can be mapped to the 2D UI. Accordingly, when the user moves his or her hands in the PHIZ, the cursor correspondingly moves on the display. Movement in the z direction (i.e., back and forth) in the PHIZ allows for additional interactions to be performed such as pressing, zooming, 3D manipulations, or other forms of input to the UI.

20 Claims, 14 Drawing Sheets

(56) References Cited

U.S. PATENT DOCUMENTS

2012/0235904 A1 9/2012 Plagemann et al.
2012/0242800 A1 9/2012 Ionescu et al.

OTHER PUBLICATIONS

Saenz, Aaron, "Founders of Leap Motion: Our Amazing 3D Tracking Will Be Everywhere", Retrieved at <<http://singularityhub.com/2012/06/13/founders-of-leap-motion-our-amazing-3d-tracking-will-be-everywhere/>>, Jun. 13, 2012, (6 pages total).

Wu, et al., "'I'm the Jedi!'—A Case Study of User Experience in 3D Tele-immersive Gaming", Retrieved at <<http://monet.web.cs.illinois.edu/publications/papers/ism1Ojedi.pdf>>, In IEEE International Symposium on Multimedia, Dec. 13, 2010, (8 pages total).

Bevilacqua, et al., "3D Motion Capture Data: Motion Analysis and Mapping to Music", Retrieved at <<http://music.arts.uci.edu/dobrian/motioncapture/BevilacquaRidenourSIMS02.pdf>>, in Workshop/Symposium on Sensing and Input for Media-centric Systems, Retrieved Date: Apr. 25, 2013, (5 pages total).

"International Search Report and Written Opinion received for PCT Patent Application No. PCT/US2014/048340", Mailed Date: Oct. 31, 2014, 10 Pages (10 pages total).

* cited by examiner

ERGONOMIC PHYSICAL INTERACTION ZONE CURSOR MAPPING

BACKGROUND

Motion capture systems obtain data regarding the location and movement of a human or other subject in a physical space, and can use the data as an input to applications executing on a computing system. Many applications are possible, such as for military, entertainment, sports, and medical purposes. For example, the captured data may be used to animate a three-dimensional ("3D") human model used for an animated character or avatar in an application such as a game. While many motion capture systems perform satisfactorily, additional features and capabilities are desirable to enable users to interact more naturally with applications.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Users move their hands in a 3D physical interaction zone ("PHIZ") to control a cursor in a user interface ("UI") shown on a computer-coupled 2D display such as a television or monitor. The PHIZ is shaped, sized, and positioned relative to the user to ergonomically match the user's natural range of motions so that cursor control is intuitive and comfortable over the entire region on the UI that supports cursor interaction. A motion capture system tracks the user's hand so that the user's 3D motions within the PHIZ can be mapped to the 2D UI. Accordingly, when the user moves his or her hands in the PHIZ, the cursor correspondingly moves within the boundaries of the supported area of the UI on the display. In some implementations, the user's hand motions in the PHIZ can be mapped to cursor positions that extend beyond the physical borders of the display. Movement of the user's hand in the z direction (i.e., back and forth) in the PHIZ allows for additional interactions to be performed such as pressing, zooming, 3D manipulations, or other forms of input to the UI.

Adjustments to the basic 3D shape, size, or location of PHIZ relative to the user may be performed to tune the PHIZ to the user's ergonomic motions within the monitored space so as to correspond with the limits of the UI. For example, such adjustments may account for horizontal and vertical centering as well as impose limits on horizontal and vertical range and reach. The forward and back planes of the PHIZ may also be independently tuned to account for user motion or drift along the z direction in the space. Such tuning also enables the mapping from the 3D PHIZ to the 2D UI to be dynamically adjusted depending on context, for example, based on computing and/or capture system setup, the user's position, and/or the user experience supported by a given application.

In various illustrative examples, a whole arm ergonomic PHIZ is utilized to determine a user's hand position relative to a known point such as the shoulder where motion of the user's entire arm is unconstrained. A forearm ergonomic PHIZ enables the hand position to be determined relative to the elbow when the full motion of the user's arm is constrained, for example, when the elbow is resting on an arm of a chair. A hand ergonomic PHIZ enables the hand position, or fingertip position, to be determined relative to the user's wrist when motion of the user's forearm is constrained, for example, when lying on a couch or bed.

Utilization of the various ergonomic PHIZs may be implemented to enable different levels of granularity in cursor control. For example, the whole arm or forearm PHIZs can be used to perform coarse movement of the cursor on the UI while the fingertip location in the hand PHIZ may be utilized to provide fine control. In addition, the different ergonomic PHIZs may be dynamically selected in a discrete or continuous manner to determine a final cursor position in the UI in some implementations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
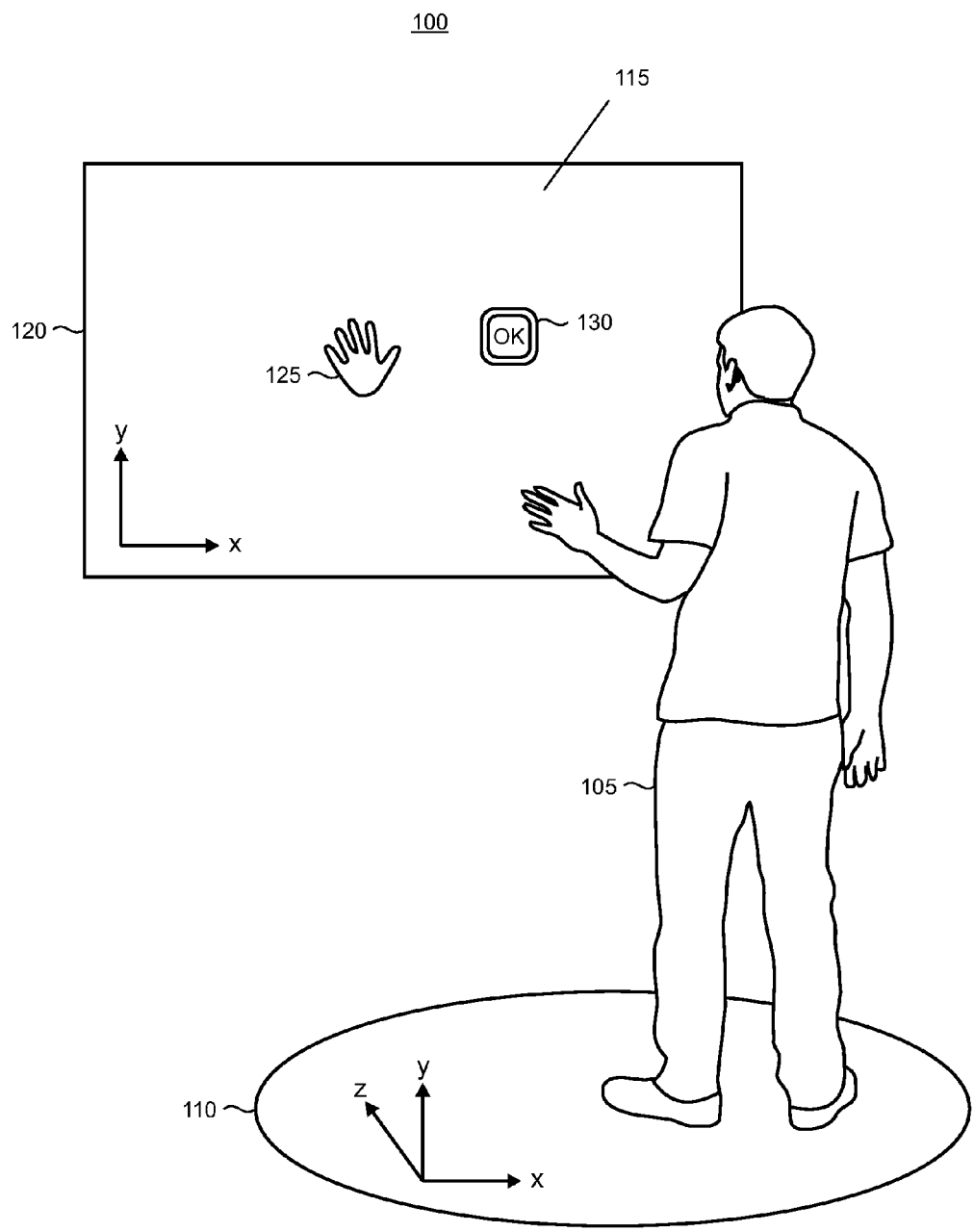
FIG. 1 shows an illustrative computing environment in which motions of a user in the three dimensional ("3D") physical space are mapped to a virtual space implemented using a user interface ("UI") on a 2D display.

FIG. 1 shows an illustrative computing environment 100 in which motions of a user 105 in a three dimensional ("3D") physical space, representatively indicated by reference numeral 110, are captured and mapped to a virtual space implemented using a user interface ("UI") 115 shown on a 2D display 120 such as a television or monitor. Such motion capture and mapping enables the user 105 to interact with various elements exposed by the UI 115 including control elements such as a cursor and buttons using body movements within the 3D physical space 110. In this illustrative example as shown, the cursor 125 is shaped like a hand. In some usage scenarios a given cursor may be allowed to traverse the entire screen area of the display, while in other scenarios an application executing in the environment 100 may only support cursor movement within a limited area of the UI 115. Alternatively, in some implementations as described in more detail below, the user 105 may interact with the UI 115 in a manner that extends beyond its visible borders.

As shown, the UI 115 is described using a 2D coordinate system with x and y directions, while the 3D physical space 110 is described using a 3D coordinate system with x, y, and z directions. Motion of the user's hand in the x and y directions in the physical space 110 could thus be used to target a button 130 on the UI 115, while motion in the z direction would enable the user 105 to press the button or perform other 3D interactions.

User motion can be captured using a variety of techniques and equipment in which positioning of the user 105 and motion of various parts of the user's body within the physical space 110 may be determined. An optical sensor and computing platform as described in the text accompanying FIGS. 15-18 below may be utilized in some implementations. However, it is emphasized that optical sensors or camera systems are not the only types of equipment that may be used for motion capture.

Figure 2:
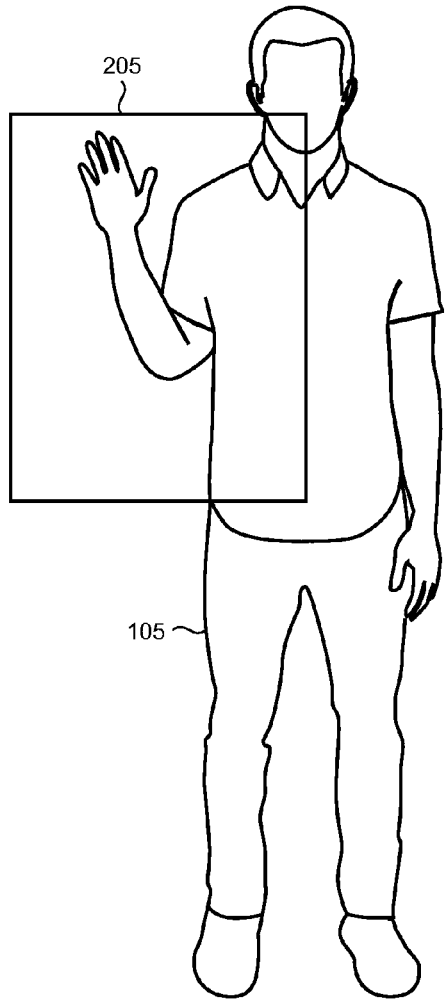
FIGS. 2-4 show simplified pictorial representations of an illustrative ergonomic physical interaction zone ("PHIZ")
Figure 3:
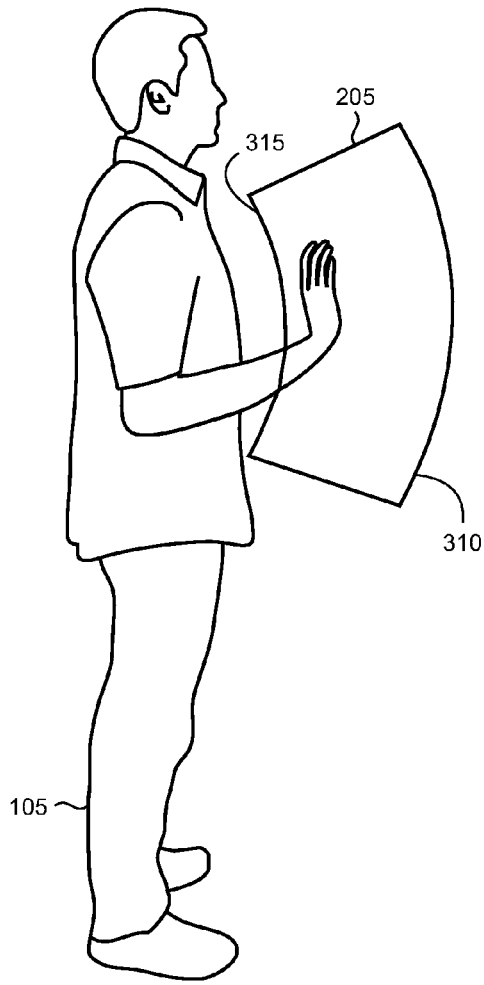
Figure 4:
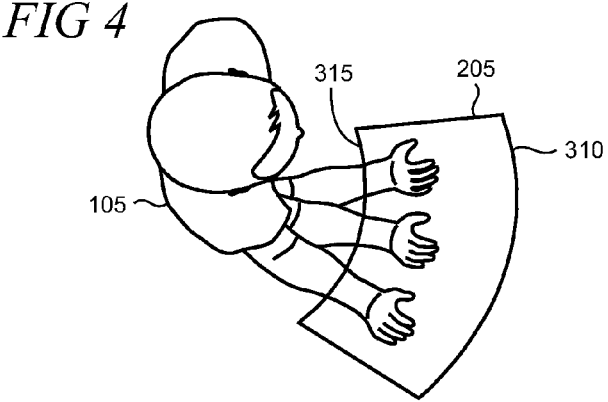

In this particular illustrative example, the mapping between the user motions in the physical space and cursor motion/interactions in the virtual space may be implemented using an ergonomic physical interaction zone ("PHIZ") or multiple ergonomic PHIZs in some scenarios. FIGS. 2-4 show a pictorial representation of an illustrative ergonomic PHIZ 205. It is noted that the pictorial representations of the ergonomic PHIZ 205 are simplified for sake of clarity in exposition and that the actual size, shape, or location of the ergonomic PHIZ relative to the user 105 can be expected to vary from what is shown as needed to meet the needs of a particular implementation.

The ergonomic PHIZ 205 is a 3D volume in the physical space in which the user 105 moves his hands. Hand motion within the ergonomic PHIZ results in cursor motion and interaction such as presses within a supported area on the UI. The PHIZ 205 is shaped, sized, and positioned relative to the user 105 to ergonomically match the user's natural range of motions so that the user can comfortably reach everything on the UI to advantageously enable interaction that is consistent and intuitive. A separate PHIZ can be provided for each of the user's hands in some implementations.

As shown in FIG. 2 in this illustrative example, the frontal area of the ergonomic PHIZ 205 spans approximately from the user's head to the mid portion of the torso. Typically, the area of the ergonomic PHIZ 205 will be sized relative to the user's size and location within the physical space. As shown in FIGS. 3 and 4, instead of mapping from a flat, rectangular area that has the same size, shape, and aspect ratio as the screen on the display, the ergonomic PHIZ 205 uses curved forward and back planes, as respectively indicated by reference numerals 310 and 315.

The curvature of the forward and back planes of the ergonomic PHIZ 205 takes the natural range of movement and extension of the user's arm into account. Such motion may be described, for example, in terms of rotation about the user's arm joints. These joints include the shoulder, elbow, and wrist, two of which (the shoulder and wrist) provide multiple degrees-of-freedom of motion. The position of the user's hand relative to the shoulder may be described using a spherical coordinate system in which the shoulder joint functions as the origin.

The forward plane 310 of the ergonomic PHIZ will typically take a partially ellipsoidal shape with the long axis of the ellipsoid being along the y direction. This shape is due to the ergonomic motion of the user's arm in the physical space where moving in the y-z planet ends to involve rotation about both the shoulder and elbow joints, while moving in the x-y plane tends to involve rotation about only the shoulder joint.

Figure 5:
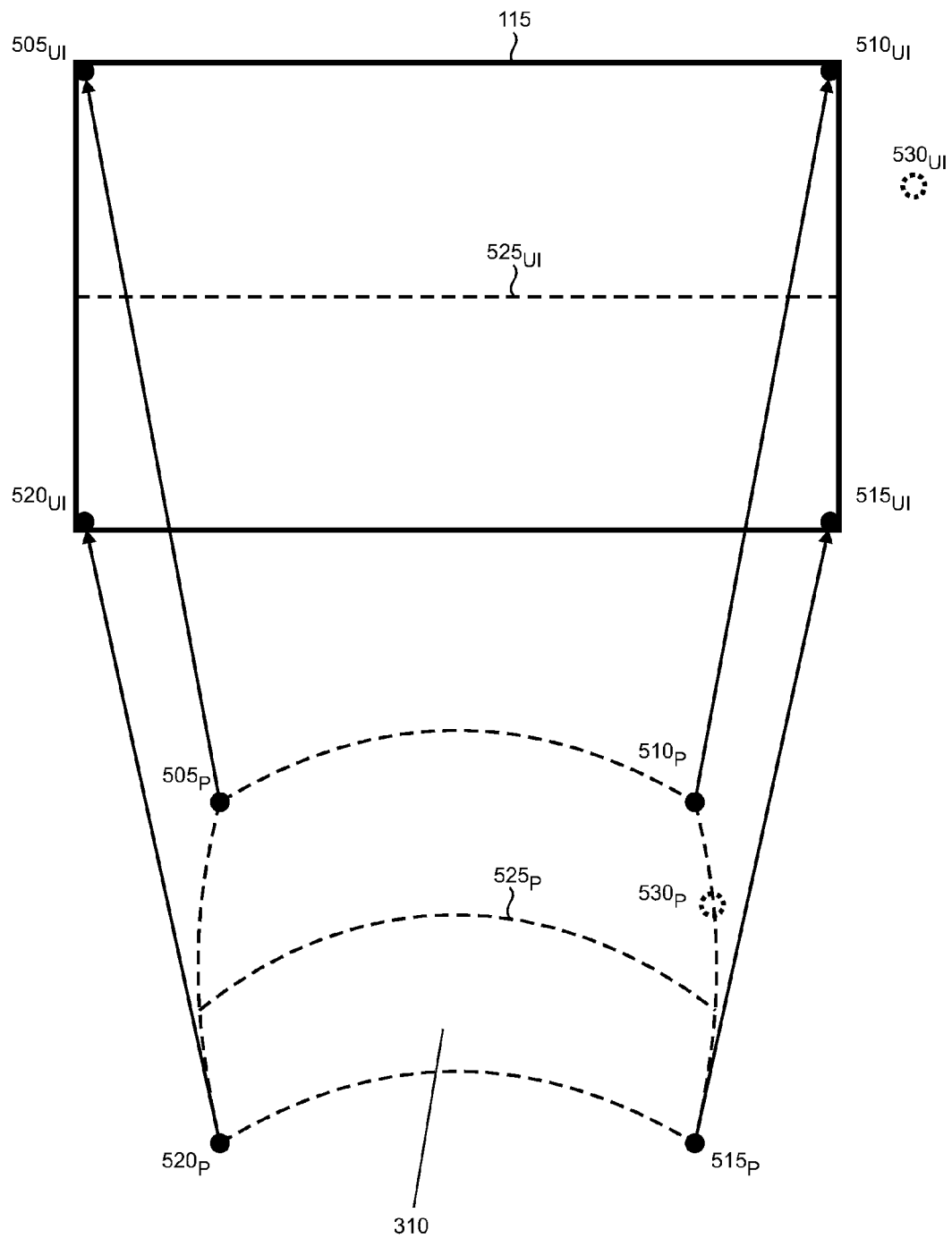
FIG. 5 shows an illustrative example of mapping between various points on the forward plane of a PHIZ and a UI.

FIG. 5 shows an illustrative example of mapping between various points on the forward plane 310 of the ergonomic PHIZ (the perimeter of which is shown as a dashed line) and the UI 115 to implement cursor movement. It will be appreciated that the mapping for other points within the ergonomic PHIZ 205 to the UI 115 will be similar to what is shown in FIG. 5. In this illustrative example, the arrows indicate that point $505_P$ in the PHIZ is mapped to point $505_{UI}$ in the UI, point $510_P$ is mapped to point $510_{UI}$, point $515p$ is mapped to point $515_{UI}$, and point $520_P$ is mapped to point $520_{UI}$. Similarly, motion of the user's hand along line $525_P$ in the ergonomic PHIZ would correspond to cursor motion along line $525_{UI}$ in the UI.

As shown in FIG. 5, the mapping enables cursor motion in the x and y directions on the flat UI even though the forward plane of the PHIZ is curved to accommodate ergonomic motion. Motion of the user's hand in the z direction in the physical space may be measured, for example, by measuring the extension of the hand relative to the user's shoulder, in order to perform button presses or other actions on the UI.

The mapping between the ergonomic PHIZ 205 and UI 115 can typically enable points at the extreme perimeter of the UI (indicated by the heavy line in FIG. 5) to be accessed by the user. However, the mapping may also be implemented in some cases so that positions within the ergonomic PHIZ 205 are mapped to points beyond the UI's visible boundaries. For example, point $530_P$ could map to point $530_{UI}$ that extends beyond the perimeter of the UI, as shown. Such mapping may enable a variety of UI interactions such as cursor-based manipulation of objects or content (e.g., a list, grid, etc.) that are larger than the display. In an illustrative example, the user can pan the objects/content with different velocities based on the cursor's distance from the UI edge and/or the user's direction of motion.

Figure 6:
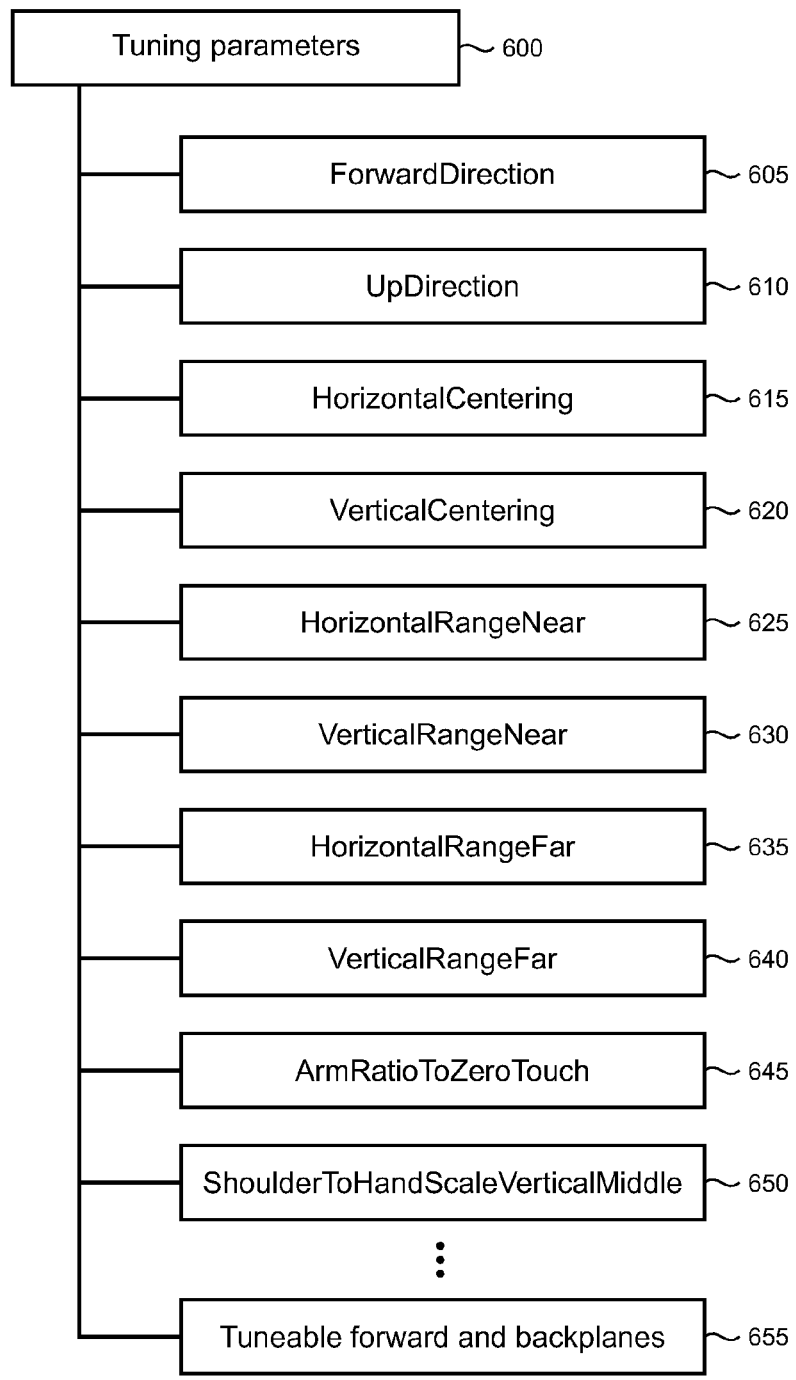
FIG. 6 shows an illustrative taxonomy of tuning parameters that may be applied to an ergonomic PHIZ.

In some implementations, the basic partially ellipsoidal shape of the ergonomic PHIZ may be tuned using a variety of parameters. Such tuning enables further refinement of the size, shape, or location of the PHIZ to provide ergonomic optimization across a population of users. An illustrative taxonomy of tuning parameters 600 is shown in FIG. 6. The tuning parameters shown in FIG. 6 and described below are intended to be illustrative and the particular parameters utilized in a specific implementation can vary. It will be appreciated that tuning parameters other than those shown in FIG. 6 may also be utilized in some cases.

The basic shape of the ergonomic PHIZ, as noted above, takes into account the rotation of the user's hand relative to the shoulder joint in the forward and up directions (tuning parameters 605 and 610, respectively). Angular offsets can be added to center the ergonomic PHIZ in each of the horizontal and vertical directions with respect to the user (615, 620). Angular horizontal and vertical ranges may also be applied to limit the amount of movement needed in the physical space to reach the extents of the UI (625, 630). Similarly, it may be desirable to further reduce the extent of the PHIZ when the user is reaching further from his shoulder. To meet this need, additional horizontal and vertical ranges are applied to accommodate the user's reach when closer than the furthest reach point (635, 640).

The linear distance from the user's shoulder to the hand is the current reach of the user. The length of the user's arm can be observed to use as a basis of the range of the user's reach. In order to identify a comfortable retracted arm position, the ArmRatioToZeroTouch tuning parameter (645) is utilized to represent this portion of the user's arm length.

It has also been determined that when users are reaching higher, they have a tendency to extend their arms further away from their shoulders. To account for this tendency, their reach may be shortened when their vertical position is in the top portion of the ergonomic PHIZ. The tuning parameter ShoulderToHandScaleVerticalMiddle (650) is a multiplier used to shorten the reach when at the middle of the vertical portion of the ergonomic PHIZ. As the user moves further up in the ergonomic PHIZ, the value of this parameter can linearly increase to return the user's reach to its full value.

The forward and backplanes may also be independently adjusted as tuning parameters (655). The ideal backplane tuning strikes a balance between competing factors. From an energy and ergonomic perspective a small backplane located as close to the center of mass of the total arm of the user is typically optimal. However, practical limitations in sensor resolution, in some implementations, require that a larger PHIZ backplane be utilized for increased targeting accuracy. Accordingly, the optimal backplane may be found by evaluating the targeting accuracy of test subjects with a variety of arm lengths in both seated and standing postures. The backplane size can be decreased until there is a noticeable impact on targeting accuracy across the test population.

The forward plane is likewise tunable. For example, if the user's arm is capable of swinging a certain angular range, at full extension such maximum swing might prove to be uncomfortable for the user. By tuning the forward plane to reduce the angular range by some amount, the user's comfort at full arm extension can be increased while still being able to reach all of the desired area on the UI.

Figure 7:
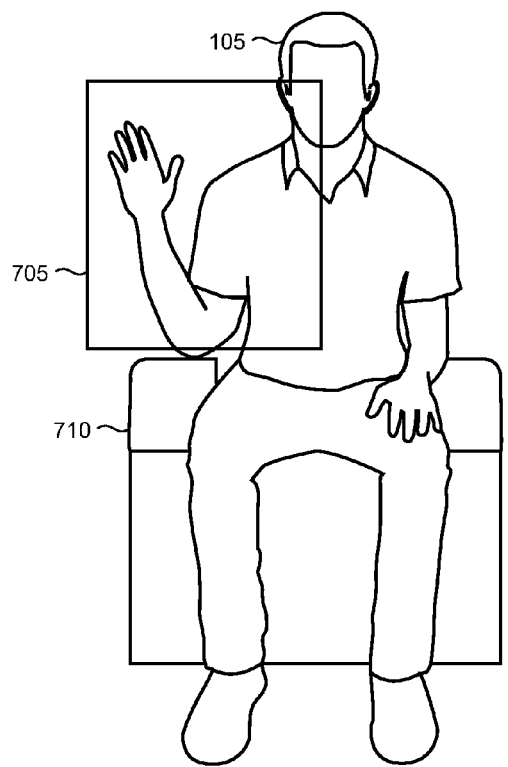
FIG. 7 shows how an ergonomic PHIZ may be dynamically altered to fit a particular individual usage scenario.

The tuning parameters 600 may be statically utilized in some implementations where the parameters are selected a priori and applied to the ergonomic PHIZ in a manner that provides for comfortable and intuitive cursor control across a population of users. Alternatively, one or more tuning parameters may be dynamically applied and/or adjusted to meet the needs of an individual usage scenario. For example as shown in FIG. 7, in scenarios where the user 105 is seated, the ergonomic PHIZ 705 may be reduced in size and positioned above the armrests 710 of the chair which tend to constrain the full motion of the user's arm. In such a case, the centering and range parameters may be dynamically adjusted so that the user 105 can comfortably reach and interact with all the control elements on the UI while seated.

Figure 8:
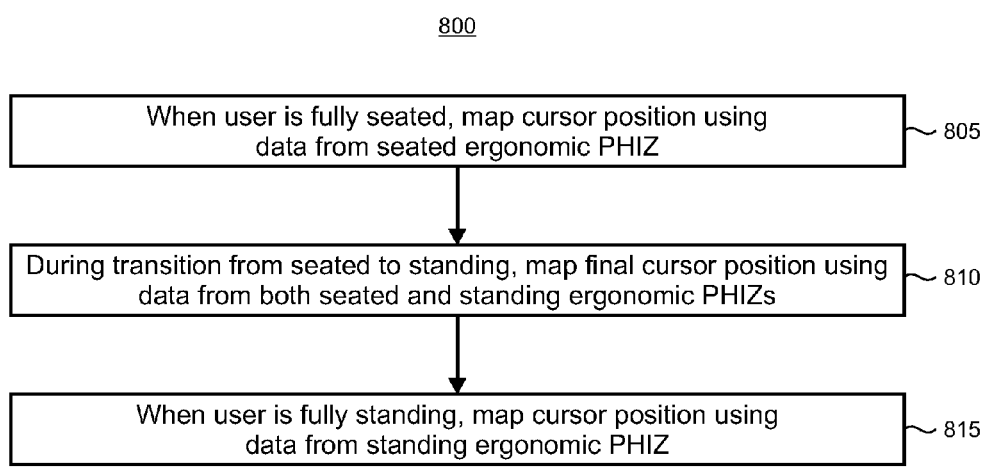
FIG. 8 is a flowchart of an illustrative method for dynamically selecting between different PHIZs.

If the user 105 stands up, the tuning parameters can be dynamically adjusted again so that the ergonomic PHIZ is matched to the user's full and unconstrained arm motion. It may be desirable in some implementations where the tuning parameters are dynamically applied and/or adjusted to use motion data from more than one ergonomic PHIZ at a time in order to determine a final cursor position on the UI. For example, as shown in the flowchart 800 in FIG. 8 when the user is seated, the data from the smaller PHIZ noted above (termed the "seated ergonomic PHIZ") is utilized for cursor mapping at step 805.

At step 810, during the transition period from seated to standing, the final cursor position may be mapped using data from both the seated ergonomic PHIZ as well as the PHIZ shown in FIGS. 2-4 and described in the accompanying text (termed the "standing ergonomic PHIZ" for the purposes of this particular example). Here, the data can be weighted or otherwise combined on a continuous basis, rather than selecting one discrete PHIZ or the other, to avoid sudden transitions and/or jumps in cursor movement that the user may not expect. Consider the output of each PHIZ is a zero to one value in each of x, y, and z. If the change of the x and y values over some time interval is viewed as a normalized PHIZ velocity, then the velocities of each of the PHIZs can be compared. The PHIZ that is consistently getting the greatest amount of velocity may be considered the one with which the user has the greatest desire to control the cursor. Some averaging and jerk filtering could also be used to prevent a sporadic movement in the non-active PHIZ from stealing priority from the active PHIZ. Increased priority or bias may also be given to the larger standing ergonomic PHIZ as well in some implementations.

When the user is fully standing at step 815, the cursor position on the UI is mapped using data solely from the standing ergonomic PHIZ.

Figure 9:
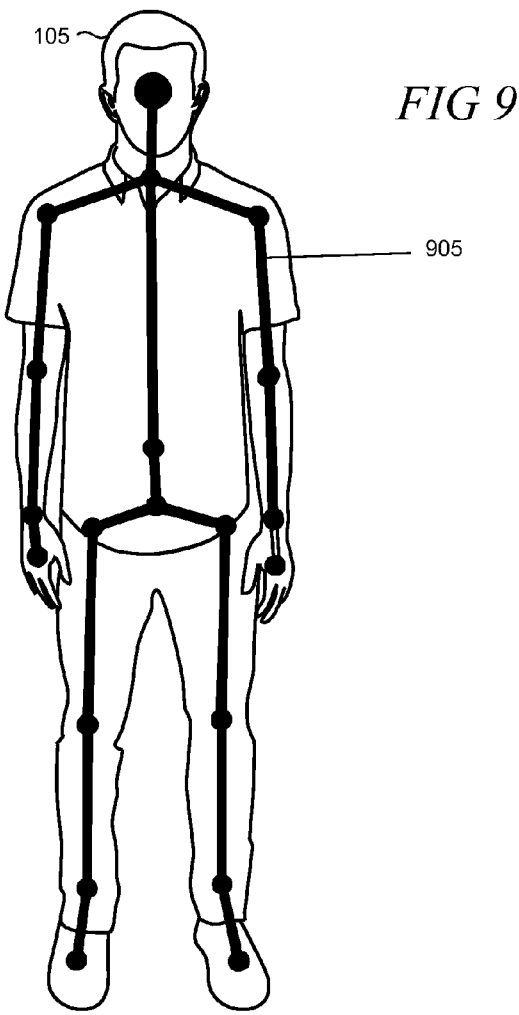
FIGS. 9 and 10 show illustrative skeleton models that show body joints that may be located and tracked within the physical space.
Figure 10:
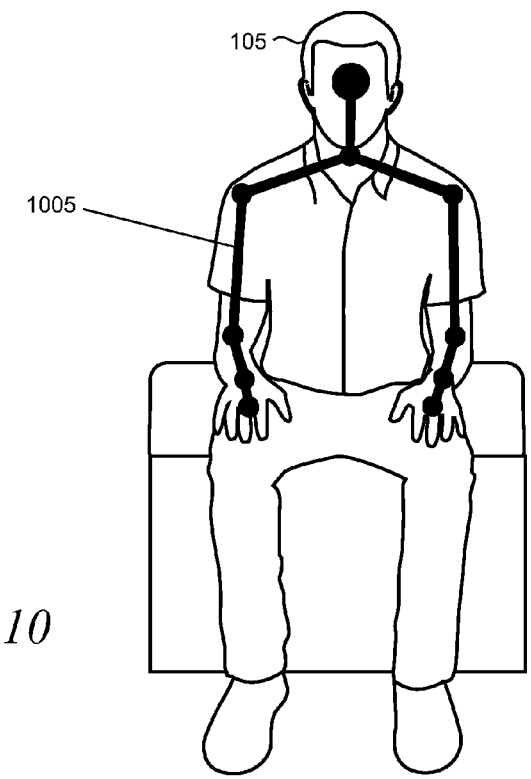

The determination of the user's orientation within the physical space, for example whether seated or standing, may be determined by the motion capture system and/or related systems. For example, as described below in the text accompanying FIG. 17, skeleton tracking may be implemented in some systems in order to process gestures (i.e., any form of user movement that may be used as an input to a UI or interpreted as interaction with an application executing in the computing environment). FIGS. 9 and 10 respectively show a full skeleton model 905 and a seated skeleton model 1005. As shown, the full skeleton model 905 includes 20 joints while the seated skeleton model 1005 includes only the upper 10 joints. In typical implementations using the optical sensor described below, the skeleton models are usable to determine the positions of a user's joints within the physical space even when joints are not within the sensor's direct field of view. In such cases, the positions of the obscured joints may be predicted based on the skeleton model.

Figure 11:
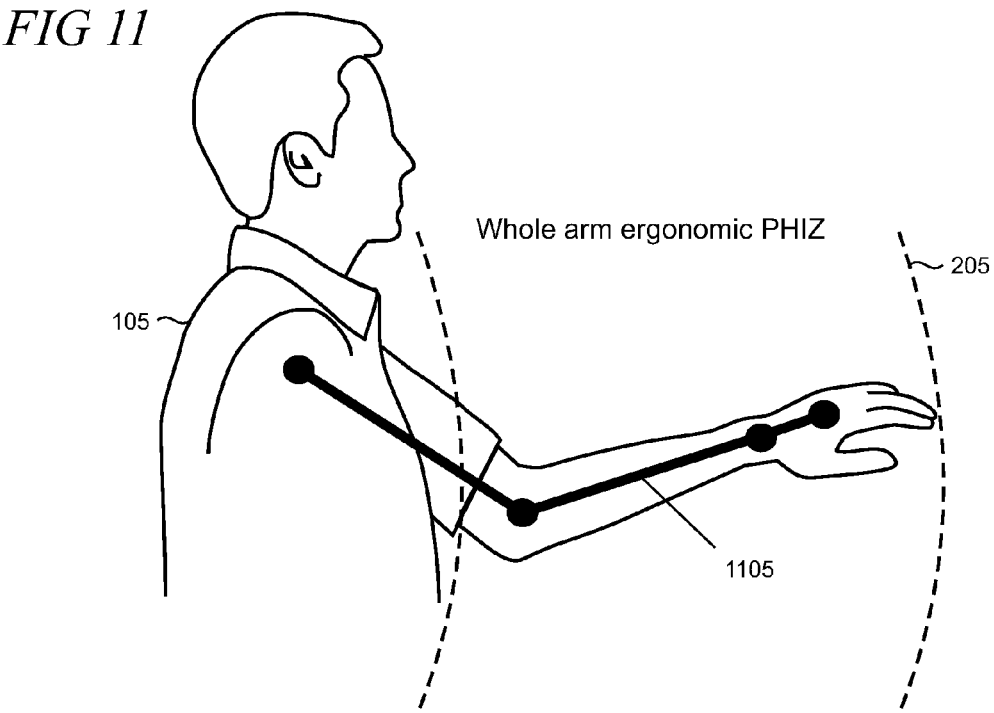
FIGS. 11-13, respectively, show joint models underlying a whole arm PHIZ, a forearm PHIZ, and a hand PHIZ.
Figure 12:
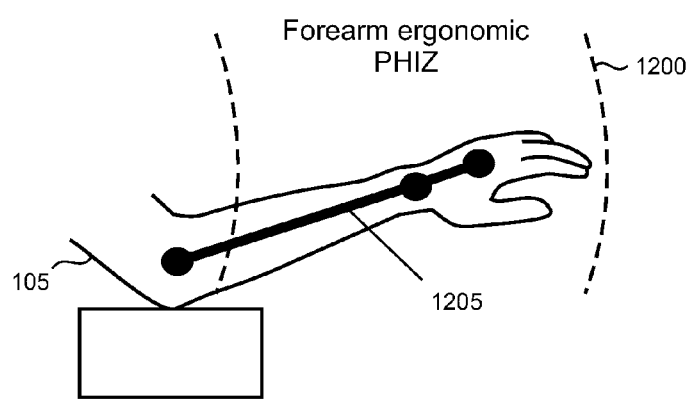
Figure 13:
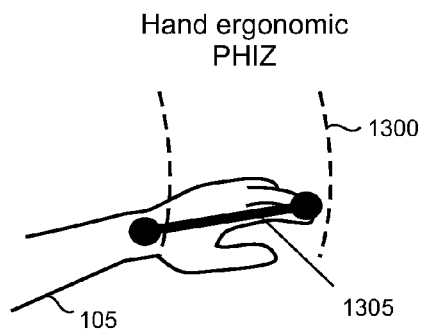

The ability to identify and locate a variety of body joints in the physical space enables the utilization of multiple different ergonomic PHIZs having different shapes and sizes. FIGS. 11-13 respectively show the joint models used to implement a whole arm ergonomic PHIZ 205, a forearm ergonomic PHIZ 1200, and a hand ergonomic PHIZ 1300. The whole arm ergonomic PHIZ may be utilized, for example, when the user's arm has a full range of motion without constraint. It is noted that the whole arm ergonomic PHIZ 205 shown in FIG. 11 is the same PHIZ referred to in the text accompanying FIGS. 2-4 and 8. It is further noted that the dashed lines in FIGS. 11-13 are simplified pictorial representations of the respective ergonomic PHIZs and the shapes of the actual PHIZs can vary from what are shown.

The joint model 1105 underlying the whole arm ergonomic PHIZ 205 includes the shoulder, elbow, and wrist joints. As described above, the motion of the user's hand relative to the shoulder is used to map motion of the user's hand from the PHIZ to the UI.

The forearm ergonomic PHIZ 1200 may be used, for example, when the full motion of the user's arm is constrained such as when the user's elbow is resting on an arm of a chair, as illustratively shown in FIG. 7. The joint model 1205 underlying the forearm ergonomic PHIZ 1200 includes the elbow and wrist joints. The motion of the user's hand relative to the elbow is used to map motion of the user's hand from the PHIZ to the UI. Accordingly, the origin of the spherical coordinate system would be located at the elbow joint for the forearm ergonomic PHIZ 1200. As with the whole arm ergonomic PHIZ, tuning parameters may be applied to the forearm ergonomic PHIZ 1200, for example, to adjust for horizontal and vertical centering as well as horizontal and vertical range.

The hand ergonomic PHIZ 1300 may be used, for example, when the user's forearm is constrained. The user could be lying on the floor, a bed, or a couch in a way that constrains full motion of the forearm. Alternatively, the user could be standing but with a hand bag or coat hanging on his/her arm which constrains motion. In some cases when using an optical sensor system to detect user motion, the view of the user could be partially obscured. For example, the user could be sitting on a couch with a laptop or dinner tray on his lap which blocks the sensor view at the mid-body and an end of the couch blocks arm movement at the side of the user's body.

The joint model 1305 underlying the hand ergonomic PHIZ 1300 includes the elbow and wrist joints. The motion of the user's hand relative to the wrist is used to map the user's hand from the PHIZ to the UI. Accordingly, the origin of the spherical coordinate system would be located at the wrist joint for the hand ergonomic PHIZ 1300. The motion of one or more fingertips relative to the wrist may also be used to map cursor motion in alternative implementations. As with the larger ergonomic PHIZs tuning parameters may be applied to the hand ergonomic PHIZ 1300, for example, to adjust for horizontal and vertical centering as well and horizontal and vertical range. In some implementations, the cursor mapping may be performed using the motion of the user's hands or fingertips relative to some other origin point or identifiable feature such as a vector projecting forward from the user's body. The use of fingertips to map cursor motion may also enable scenarios in which the location of the hand is used to perform coarse cursor movement while the fingertip position provides fine grain control.

Figure 14:
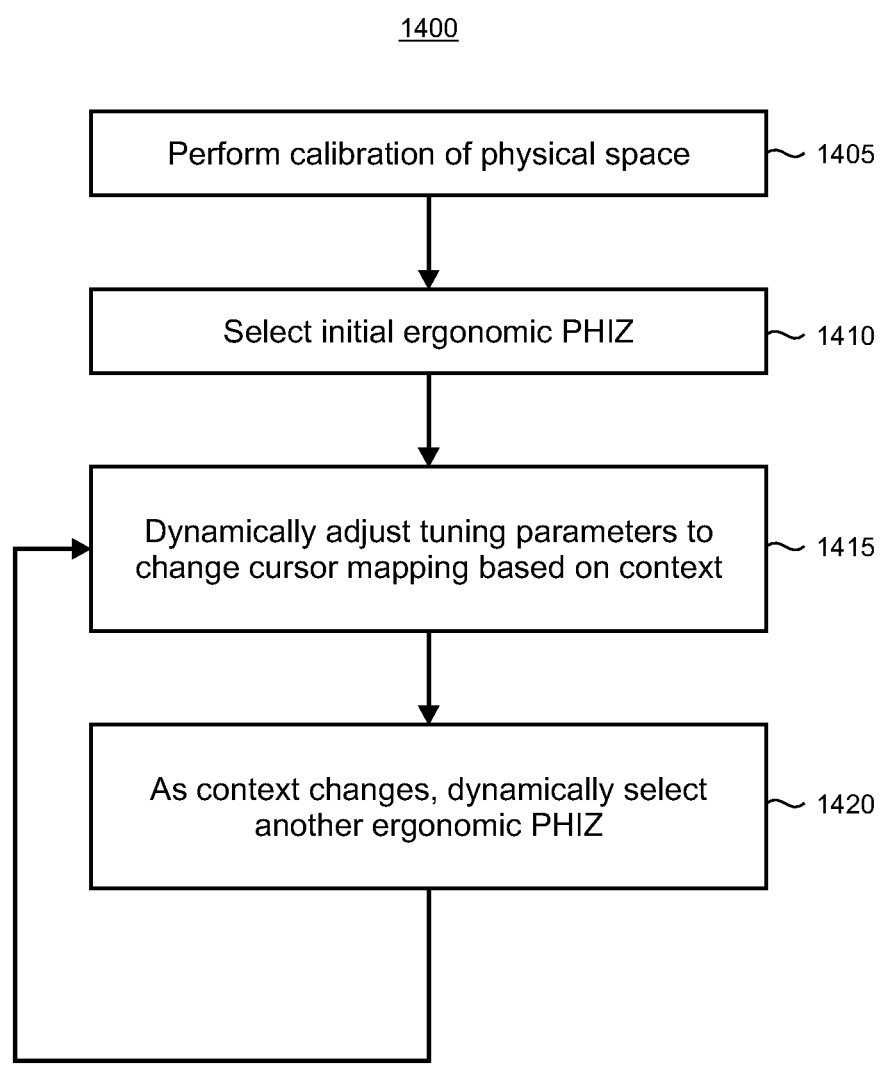
FIG. 14 is a flowchart for an illustrative method for calibrating a physical space, dynamically changing cursor mapping, and dynamically selecting among multiple PHIZs of different sizes, shapes, and locations.

The different ergonomic PHIZs 205, 1200, and 1300 may be selectively used in some implementations. FIG. 14 is a flowchart for an illustrative method 1400 for calibrating a physical space, dynamically changing cursor mapping, and dynamically selecting among the multiple PHIZs of different sizes and shapes. The method starts at step 1405 where the physical space 110 (FIG. 1) is calibrated. This step may be optionally performed, since having a user perform explicit calibration tasks may not be appropriate in all usage scenarios. The physical space calibration may include measuring the user's preferred position by offering a single button on the UI, for example located on the top left corner, to be pressed. When the user presses that button, the position of the press is taken and used to compute adjusted horizontal and vertical centering parameters. This technique may also be extended to achieve calibration for ranges and reach to press distances. The tuning parameters may be further adjusted based on a number of calibration inputs that have varying degrees of confidence.

Data from the single button press calibration may be aggregated over a population of users. By having users perform proscribed presses they nominally define a line in three spaces. By taking all defined lines for all users in the population, an ideal PHIZ shape can be created that minimizes x and y drift for the users.

An initial ergonomic PHIZ is selected at step 1410. The position of the user within the physical space and any constraints on user motion can be factors in making the selection. For example, if the user is seated, then the forearm ergonomic PHIZ can be initially selected. If the user is standing and has unconstrained arm motion, then the whole arm PHIZ can be initially selected.

At step, 1415 one or more of the tuning parameters 600 (FIG. 6) can be dynamically adjusted to tailor the ergonomic PHIZ to the particular context in which it is being used. Any of a number of contextual factors may be considered for such dynamic adjustment which can alter the size, shape, and/or location of the ergonomic PHIZ. These include, for example, the set-up of the particular motion capture system that is being utilized, the user's position within the physical space (e.g., how far away from the optical sensor in implementations where such device is being used), as well as the specific context provided by an application. In some implementations, the context may include past behaviors of the user which may be used to identify patterns that may be utilized to dynamically apply the tuning parameters 600 to the ergonomic PHIZ.

In the case of context provided by an application, the tuning parameters can adjust the size, shape, and location of the PHIZ in the physical space depending on what is being shown on the UI and how it is being shown. For example, if the application deals with the presentation of media content such as a movie or television show, the transport controls (e.g., stop/start/pause/fast forward/fast back/skip ahead/skip back, etc.) may be presented as a horizontal array of buttons on the bottom of the UI below the displayed content. In this case, the tuning parameters may be dynamically adjusted to shape the ergonomic PHIZ in a way that makes the buttons large and easy to target and press within the physical space while still appearing normal and small on the UI.

At step 1420, another ergonomic PHIZ can be selected as the context changes. For example, if the user sits down and his arm becomes constrained, the whole arm ergonomic PHIZ can be swapped out for the forearm PHIZ. The lower half of the user may become occluded from view of an optical sensor (for example if the user moves within the physical space behind a chair or other piece of furniture), in which case it may also be advantageous to switch to the forearm ergonomic PHIZ. As with the illustrative example shown in FIG. 8 and described in the accompanying text, the selection between ergonomic PHIZs may be performed continuously, rather than discretely, to avoid any jarring or sudden transitions that the user does not expect. However, discrete ergonomic PHIZ selection might be desirable in some applications.

Control returns to step 1415 where tuning parameters for the newly selected ergonomic PHIZ may be dynamically adjusted based on context.

Discussion is now presented regarding a specific illustrative implementation of ergonomic PHIZ cursor mapping using a computing system that employs an optical sensor to capture motions of the user within the physical space. It is emphasized that this implementation is intended to be illustrative and that other computing systems having different types of motion capture may still benefit by using ergonomic PHIZ cursor mapping as described herein.

Figure 15:
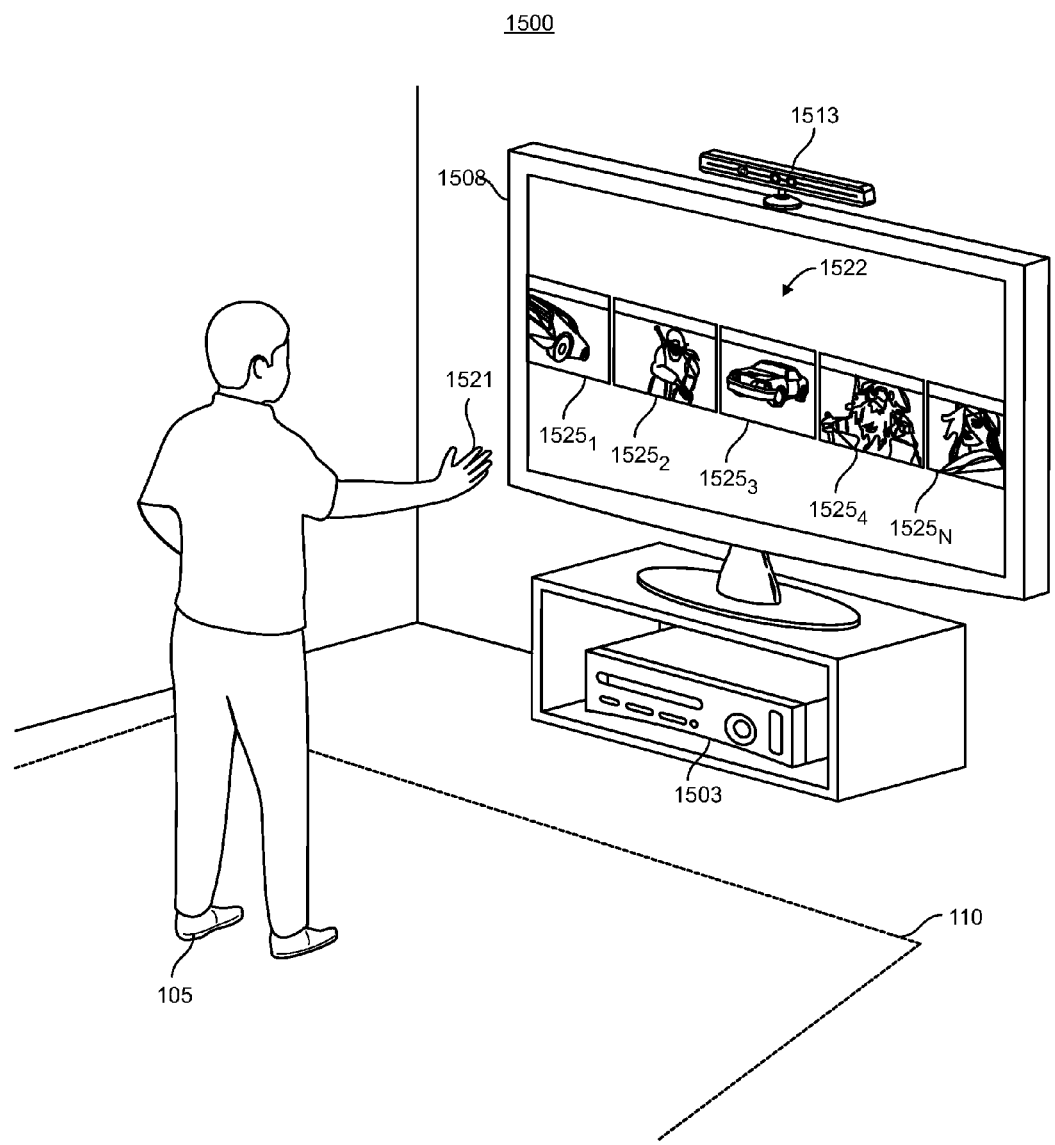
FIGS. 15 and 16 show an illustrative computing environment, including a multimedia console and an optical sensor, in which the present ergonomic PHIZ cursor mapping may be implemented.

FIG. 15 shows a particular illustrative computing environment 1500 in which the present ergonomic PHIZ cursor mapping may be implemented. The environment 1500 includes a computing platform such as multimedia console 1503 that is typically configured for running gaming and non-gaming applications using local and/or networked programming and content, playing pre-recorded multimedia such as optical discs including DVDs (Digital Versatile Discs) and CDs (Compact Discs), streaming multimedia from a network, participating in social media, browsing the Internet and other networked media and content, or the like, using a coupled audio/visual display 1508, such as a television to display the UI. In alternative implementations, the multimedia console can be replaced by a suitably adapted personal computer ("PC") such as a desktop, laptop, or notebook PC, tablet, or similar computing platform.

The multimedia console 1503 in this example is operatively coupled to an optical sensor 1513 which may be implemented using one or more video cameras that are configured to visually monitor the physical space 110 (indicated generally by the dashed line in FIG. 15) that is occupied by the user 105. As described below in more detail, the optical sensor 1513 is configured to capture, track, and analyze the movements and/or gestures of the user 105 so that they can be used as controls that may be employed to affect, for example, an application or an operating system running on the multimedia console 1503. Various motions of the hands 1521 or other body parts of the user 105 may correspond to common system-wide tasks such as selecting a game or other application from a main user interface.

For example, as shown in FIG. 15, the user 105 can navigate among selectable objects 1522 that include various icons $1525_{1-N}$ that are shown on the coupled display 1508, browse through items in a hierarchical menu, open a file, close a file, save a file, or the like. In addition, the user 105 may use movements and/or gestures to end, pause, or save a game, select a level, view high scores, communicate with a friend, etc. Virtually any controllable aspect of an operating system and/or application may be controlled by movements of the user 105. In many contexts, a cursor or similar device will be displayed on the UI to aid the user in interacting with the console and applications that execute on it. A full range of motion of the user 105 may be available, used, and analyzed in any suitable manner to interact with an application or operating system that executes in the environment 1500.

Figure 16:
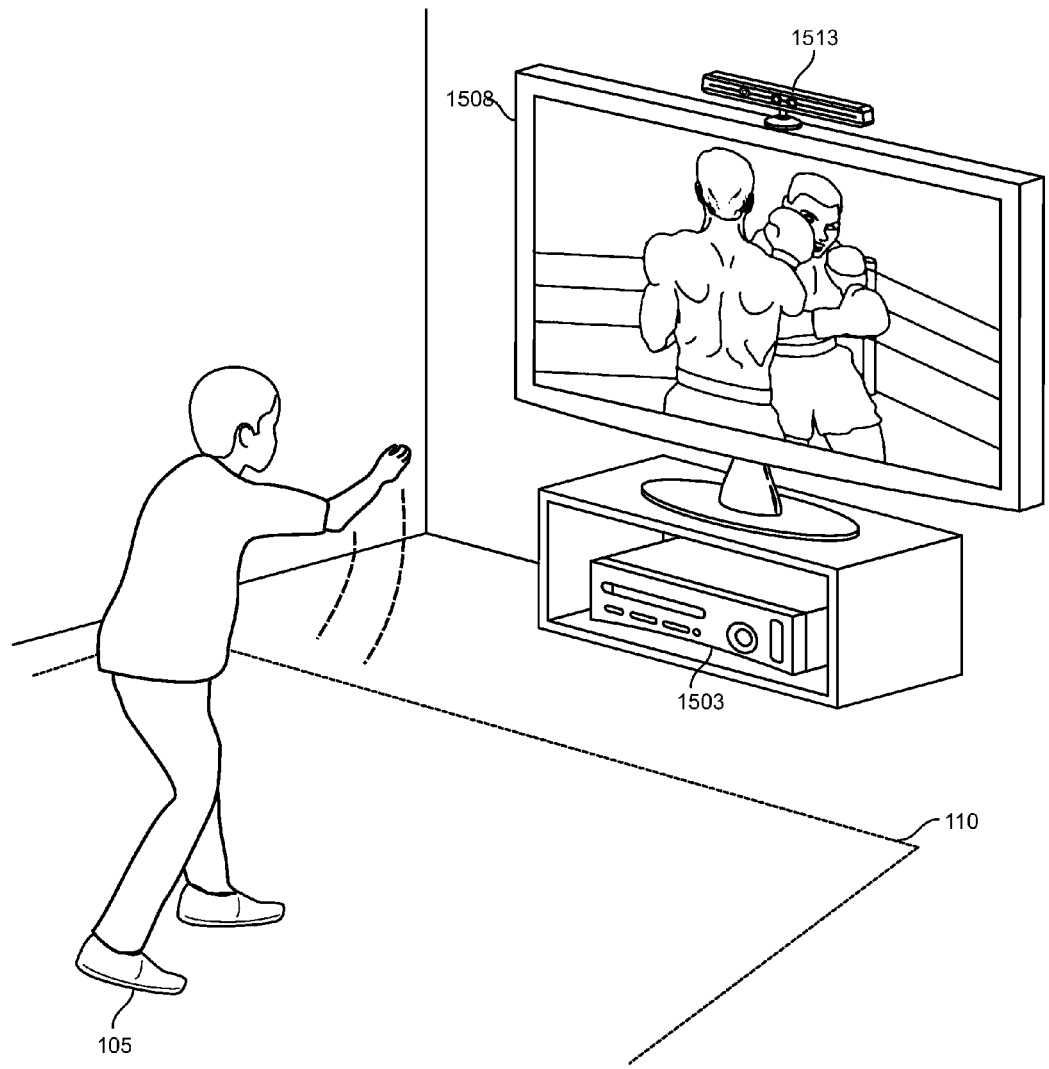
Figure 17:
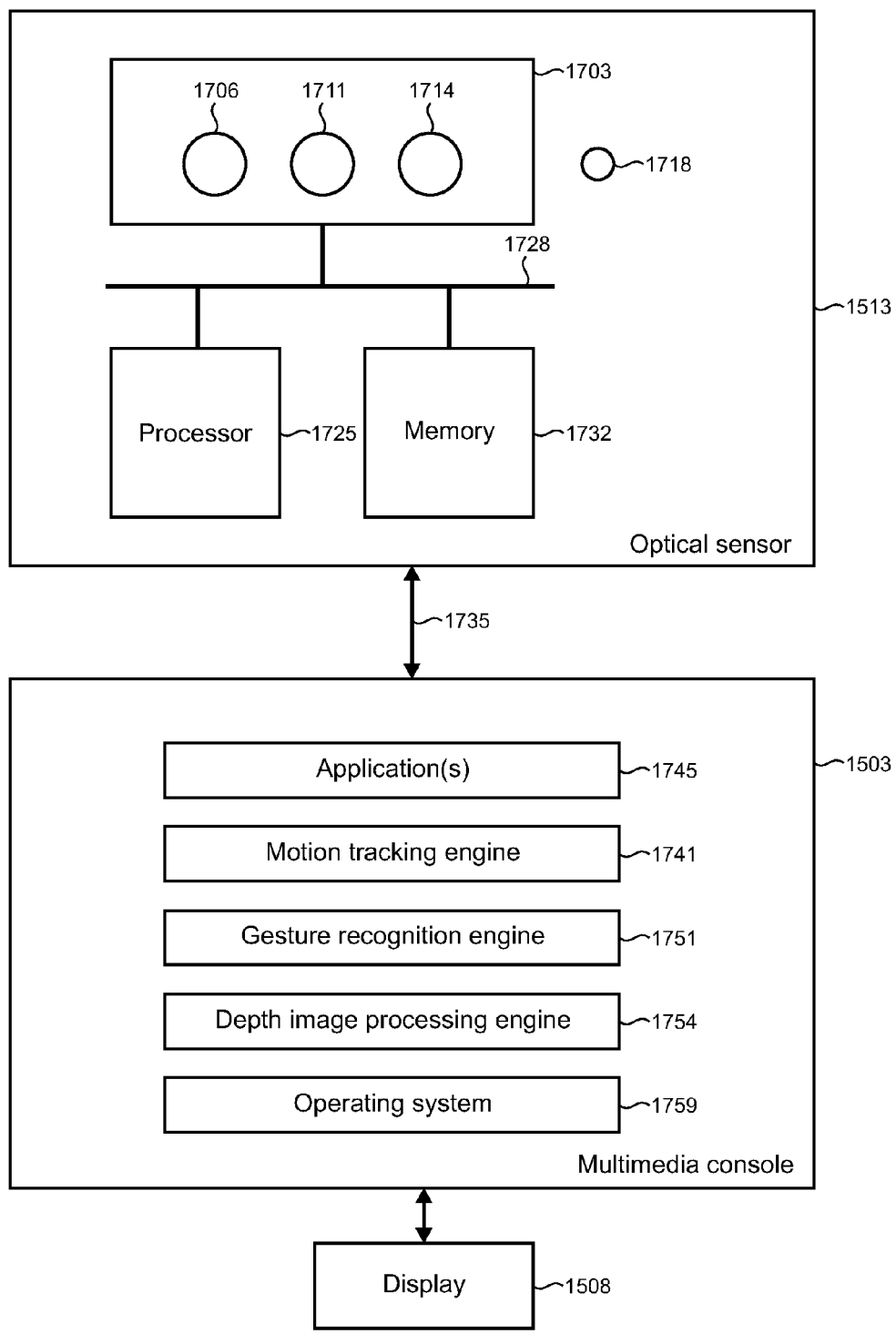
FIG. 17 shows an illustrative optical sensor and details of the multimedia console.

The optical sensor 1513 can also be utilized to capture, track, and analyze movements by the user 105 to control gameplay as a gaming application executes on the multimedia console 1503. For example, as shown in FIG. 16, a gaming application such as a boxing game uses the display 1508 to provide a visual representation of a boxing opponent to the user 105 as well as a visual representation of a player avatar that the user 105 may control with his or her movements. The user 105 may make movements (e.g., throwing a punch) in the physical space 110 to cause the player avatar to make a corresponding movement in the game space. Movements of the user 105 may be recognized and analyzed in the physical space 110 such that corresponding movements for game control of the player avatar in the game space are performed. FIG. 17 shows illustrative functional components of the optical sensor 1513 that may be used as part of a target recognition, analysis, and tracking system 1700 to recognize human and non-human targets in a capture area of the physical space 110 (FIG. 1) without the use of special sensing devices attached to the subjects, uniquely identify them, and track them in three-dimensional space. The optical sensor 1513 may be configured to capture video with depth information including a depth image that may include depth values via any suitable technique including, for example, time-of-flight, structured light, stereo image, or the like. In some implementations, the optical sensor 1513 may organize the calculated depth information into "z layers," or layers that may be perpendicular to a z axis extending from the depth camera along its line of sight.

As shown in FIG. 17, the optical sensor 1513 includes an image capture component 1703. The image capture component 1703 may be configured to operate as a depth camera that may capture a depth image of a scene. The depth image may include a 2D pixel area of the captured scene where each pixel in the 2D pixel area may represent a depth value such as a distance in, for example, centimeters, millimeters, or the like of an object in the captured scene from the camera. In this example, the image capture component 1703 includes an IR light component 1706, an IR camera 1711, and a visible light RGB camera 1714 that are configured in an array.

Various techniques may be utilized to capture depth video frames. For example, in time-of-flight analysis, the IR light component 1706 of the optical sensor 1513 may emit an infrared light onto the capture area and may then detect the backscattered light from the surface of one or more targets and objects in the capture area using, for example, the IR camera 1711 and/or the RGB camera 1714. In some embodiments, pulsed infrared light may be used such that the time between an outgoing light pulse and a corresponding incoming light pulse may be measured and used to determine a physical distance from the optical sensor 1513 to a particular location on the targets or objects in the capture area. Additionally, the phase of the outgoing light wave may be compared to the phase of the incoming light wave to determine a phase shift. The phase shift may then be used to determine a physical distance from the optical sensor to a particular location on the targets or objects. Time-of-flight analysis may be used to indirectly determine a physical distance from the optical sensor 1513 to a particular location on the targets or objects by analyzing the intensity of the reflected beam of light over time via various techniques including, for example, shuttered light pulse imaging.

In other implementations, the optical sensor 1513 may use structured light to capture depth information. In such an analysis, patterned light (i.e., light displayed as a known pattern such as a grid pattern or a stripe pattern) may be projected onto the capture area via, for example, the IR light component 1706. Upon striking the surface of one or more targets or objects in the capture area, the pattern may become deformed in response. Such a deformation of the pattern may be captured by, for example, the IR camera 1711 and/or the RGB camera 1714 and may then be analyzed to determine a physical distance from the optical sensor to a particular location on the targets or objects.

The optical sensor 1513 may utilize two or more physically separated cameras that may view a capture area from different angles, to obtain visual stereo data that may be resolved to generate depth information. Other types of depth image arrangements using single or multiple cameras can also be used to create a depth image. The optical sensor 1513 may further include a microphone 1718. The microphone 1718 may include a transducer or sensor that may receive and convert sound into an electrical signal. The microphone 1718 may be used to reduce feedback between the optical sensor 1513 and the multimedia console 1503 in the target recognition, analysis, and tracking system 1700. Additionally, the microphone 1718 may be used to receive audio signals that may also be provided by the user 105 to control applications such as game applications, non-game applications, or the like that may be executed by the multimedia console 1503.

The optical sensor 1513 may further include a processor 1725 that may be in operative communication with the image capture component 1703 over a bus 1728. The processor 1725 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. The optical sensor 1513 may further include a memory component 1732 that may store the instructions that may be executed by the processor 1725, images or frames of images captured by the cameras, user profiles or any other suitable information, images, or the like. According to one example, the memory component 1732 may include random access memory (RAM), read only memory (ROM), cache, Flash memory, a hard disk, or any other suitable storage component. As shown in FIG. 17, the memory component 1732 may be a separate component in communication with the image capture component 1703 and the processor 1725. Alternatively, the memory component 1732 may be integrated into the processor 1725 and/or the image capture component 1703. In one embodiment, some or all of the components 1703, 1706, 1711, 1714, 1718, 1725, 1728, and 1732 of the optical sensor 1513 are located in a single housing.

The optical sensor 1513 operatively communicates with the multimedia console 1503 over a communication link 1735. The communication link 1735 may be a wired connection including, for example, a USB (Universal Serial Bus) connection, a Firewire connection, an Ethernet cable connection, or the like and/or a wireless connection such as a wireless IEEE 802.11 connection. The multimedia console 1503 can provide a clock to the optical sensor 1513 that may be used to determine when to capture, for example, a scene via the communication link 1735. The optical sensor 1513 may provide the depth information and images captured by, for example, the IR camera 1711 and/or the RGB camera 1714, including a skeletal model and/or facial tracking model that may be generated by the optical sensor 1513, to the multimedia console 1503 via the communication link 1735. The multimedia console 1503 may then use the skeletal and/or facial tracking models, depth information, and captured images to, for example, create a virtual screen, adapt the user interface, and control an application.

A motion tracking engine 1741 uses the skeletal and/or facial tracking models and the depth information to provide a control output to one more applications (representatively indicated by an application 1745 in FIG. 17) running on the multimedia console 1503 to which the optical sensor 1513 is coupled. The information may also be used by a gesture recognition engine 1751, depth image processing engine 1754, and/or operating system 1759. The depth image processing engine 1754 uses the depth images to track motion of objects, such as the user and other objects. The depth image processing engine 1754 will typically report to operating system 1759 an identification of each object detected and the location of the object for each frame. The operating system 1759 can use that information to update the position or movement of an avatar, for example, or other images shown on the display 1508, or to perform an action on the user interface.

The gesture recognition engine 1751 may utilize a gestures library (not shown) that can include a collection of gesture filters, each comprising information concerning a gesture that may be performed, for example, by a skeletal model (as the user moves). The gesture recognition engine 1751 may compare the frames captured by the optical sensor 1513 in the form of the skeletal model and movements associated with it to the gesture filters in the gesture library to identify when a user (as represented by the skeletal model) has performed one or more gestures. Those gestures may be associated with various controls of an application. Thus, the multimedia console 1503 may employ the gestures library to interpret movements of the skeletal model and to control an operating system or an application running on the multimedia console based on the movements.

In some implementations, various aspects of the functionalities provided by the applications 1745, motion tracking engine 1741, gesture recognition engine 1751, depth image processing engine 1754, and/or operating system 1759 may be directly implemented on the optical sensor 1513 itself.

Figure 18:
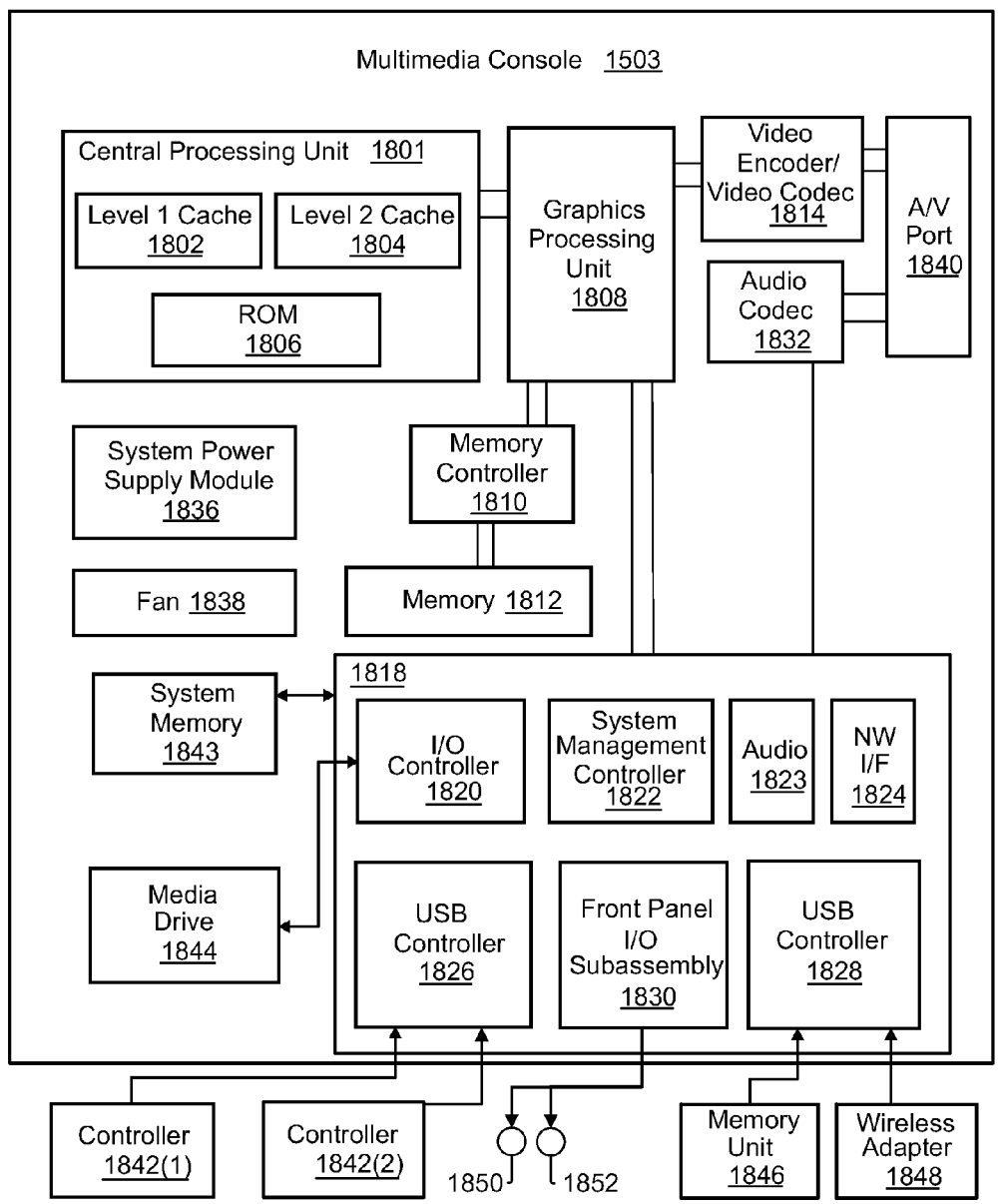
FIG. 18 shows a block diagram of an illustrative multimedia console that may be used in part to implement the present ergonomic PHIZ cursor mapping.

FIG. 18 is an illustrative functional block diagram of the multimedia console 1503 shown in FIGS. 15-17. As shown in FIG. 18 the multimedia console 1503 has a central processing unit (CPU) 1801 having a level 1 cache 1802, a level 2 cache 1804, and a Flash ROM (Read Only Memory) 1806. The level 1 cache 1802 and the level 2 cache 1804 temporarily store data and hence reduce the number of memory access cycles, thereby improving processing speed and throughput. The CPU 1801 may be configured with more than one core, and thus, additional level 1 and level 2 caches 1802 and 1804. The Flash ROM 1806 may store executable code that is loaded during an initial phase of a boot process when the multimedia console 1503 is powered ON.

A graphics processing unit (GPU) 1808 and a video encoder/video codec (coder/decoder) 1814 form a video processing pipeline for high speed and high resolution graphics processing. Data is carried from the GPU 1808 to the video encoder/video codec 1814 via a bus. The video processing pipeline outputs data to an A/V (audio/video) port 1840 for transmission to a television or other display. A memory controller 1810 is connected to the GPU 1808 to facilitate processor access to various types of memory 1812, such as, but not limited to, a RAM.

The multimedia console 1503 includes an I/O controller 1820, a system management controller 1822, an audio processing unit 1823, a network interface controller 1824, a first USB host controller 1826, a second USB controller 1828, and a front panel I/O subassembly 1830 that are preferably implemented on a module 1818. The USB controllers 1826 and 1828 serve as hosts for peripheral controllers 1842(1)-1842(2), a wireless adapter 1848, and an external memory device 1846 (e.g., Flash memory, external CD/DVD ROM drive, removable media, etc.). The network interface controller 1824 and/or wireless adapter 1848 provide access to a network (e.g., the Internet, home network, etc.) and may be any of a wide variety of various wired or wireless adapter components including an Ethernet card, a modem, a Bluetooth module, a cable modem, and the like.

System memory 1843 is provided to store application data that is loaded during the boot process. A media drive 1844 is provided and may comprise a DVD/CD drive, hard drive, or other removable media drive, etc. The media drive 1844 may be internal or external to the multimedia console 1503. Application data may be accessed via the media drive 1844 for execution, playback, etc. by the multimedia console 1503. The media drive 1844 is connected to the I/O controller 1820 via a bus, such as a Serial ATA bus or other high speed connection (e.g., IEEE 1394).

The system management controller 1822 provides a variety of service functions related to assuring availability of the multimedia console 1503. The audio processing unit 1823 and an audio codec 1832 form a corresponding audio processing pipeline with high fidelity and stereo processing. Audio data is carried between the audio processing unit 1823 and the audio codec 1832 via a communication link. The audio processing pipeline outputs data to the A/V port 1840 for reproduction by an external audio player or device having audio capabilities.

The front panel I/O subassembly 1830 supports the functionality of the power button 1850 and the eject button 1852, as well as any LEDs (light emitting diodes) or other indicators exposed on the outer surface of the multimedia console 1503. A system power supply module 1836 provides power to the components of the multimedia console 1503. A fan 1838 cools the circuitry within the multimedia console 1503.

The CPU 1801, GPU 1808, memory controller 1810, and various other components within the multimedia console 1503 are interconnected via one or more buses, including serial and parallel buses, a memory bus, a peripheral bus, and a processor or local bus using any of a variety of bus architectures. By way of example, such architectures can include a Peripheral Component Interconnects ("PCI") bus, PCI-Express bus, etc.

When the multimedia console 1503 is powered ON, application data may be loaded from the system memory 1843 into memory 1812 and/or caches 1802 and 1804 and executed on the CPU 1801. The application may present a graphical user interface that provides a consistent user experience when navigating to different media types available on the multimedia console 1503. In operation, applications and/or other media contained within the media drive 1844 may be launched or played from the media drive 1844 to provide additional functionalities to the multimedia console 1503.

The multimedia console 1503 may be operated as a standalone system by simply connecting the system to a television or other display. In this standalone mode, the multimedia console 1503 allows one or more users to interact with the system, watch movies, or listen to music. However, with the integration of broadband connectivity made available through the network interface controller 1824 or the wireless adapter 1848, the multimedia console 1503 may further be operated as a participant in a larger network community.

When the multimedia console 1503 is powered ON a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's point of view.

In particular, the memory reservation is preferably large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size, and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 1503 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1801 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1842(1) and 1842(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The optical sensor 1513 may define additional input devices for the console 1503.

Figure 19:
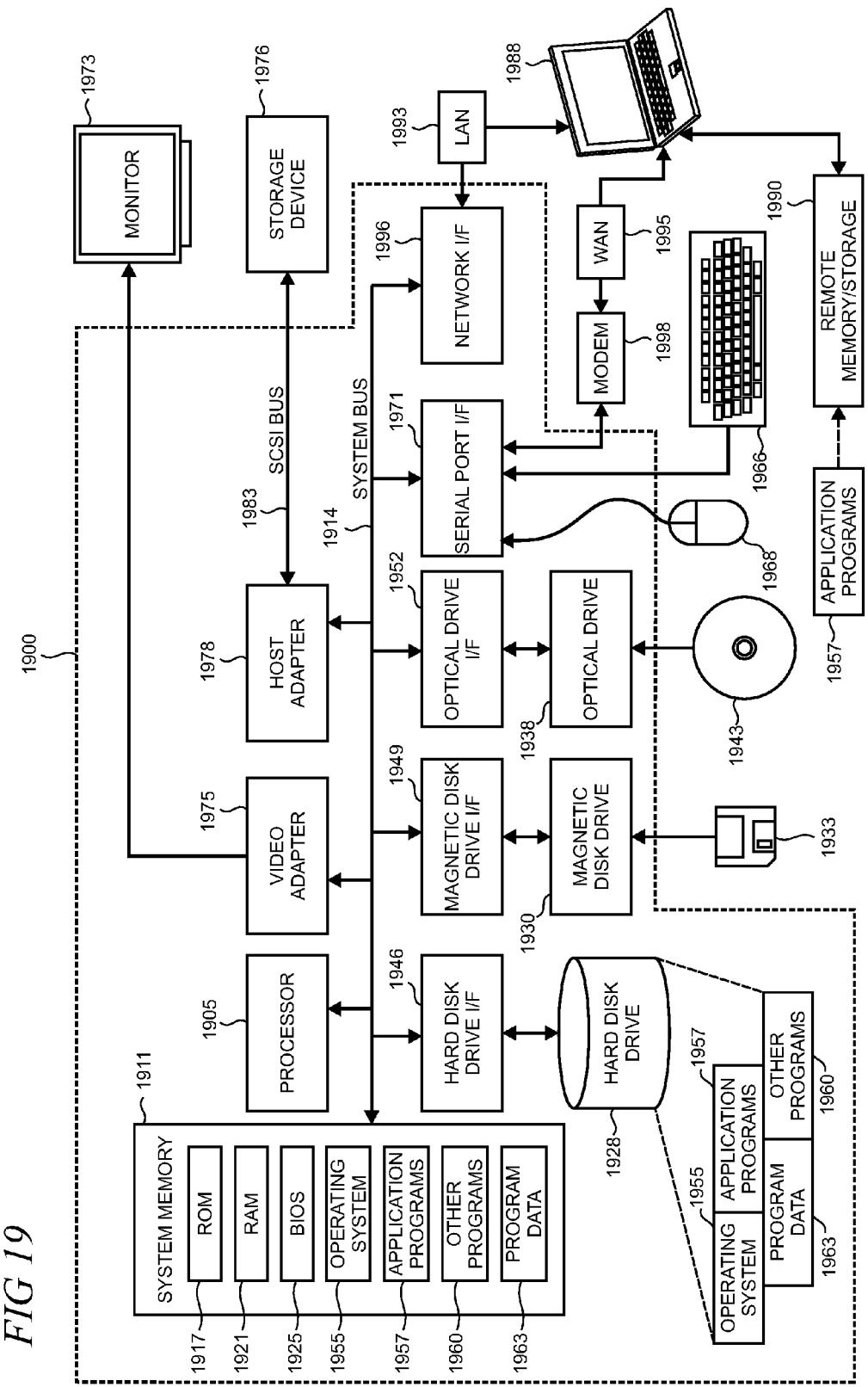
FIG. 19 is a simplified block diagram of an illustrative computer system such as a personal computer ("PC") that may be used in part to implement the present ergonomic PHIZ cursor mapping.

It may be desirable and/or advantageous to enable other types of computing platforms other than the illustrative media console 1503 to implement the present ergonomic PHIZ cursor mapping in some applications. For example, ergonomic PHIZ cursor mapping may be readily adapted to run on PCs and similar devices that are equipped with motion and/or video capture capabilities. FIG. 19 is a simplified block diagram of an illustrative computer system 1900 such as a PC, client machine, or server with which the present ergonomic PHIZ cursor mapping may be implemented. Computer system 1900 includes a processing unit 1905, a system memory 1911, and a system bus 1914 that couples various system components including the system memory 1911 to the processing unit 1905. The system bus 1914 may be any of several types of bus structures including a memory bus or memory controller, a peripheral bus, and a local bus using any of a variety of bus architectures. The system memory 1911 includes read only memory ("ROM") 1917 and random access memory ("RAM") 1921. A basic input/output system ("BIOS") 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer readable storage media provide non-volatile storage of computer readable instructions, data structures, program modules, and other data for the computer system 1900. Although this illustrative example shows a hard disk, a removable magnetic disk 1933, and a removable optical disk 1943, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present ergonomic PHIZ cursor mapping. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1933, optical disk 1943, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touch screen, touch-sensitive device, voice recognition module or device, voice command module or device, or the like. These and other input devices are often connected to the processing unit 1905 through a serial port interface 1971 that is coupled to the system bus 1914, but may be connected by other interfaces, such as a parallel port, game port, or universal serial bus ("USB"). A monitor 1973 or other type of display device is also connected to the system bus 1914 via an interface, such as a video adapter 1975. In addition to the monitor 1973, personal computers typically include other peripheral output devices (not shown), such as speakers and printers. The illustrative example shown in FIG. 19 also includes a host adapter 1978, a Small Computer System Interface ("SCSI") bus 1983, and an external storage device 1976 connected to the SCSI bus 1983.

The computer system 1900 is operable in a networked environment using logical connections to one or more remote computers, such as a remote computer 1988. The remote computer 1988 may be selected as another personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network ("LAN") 1993 and a wide area network ("WAN") 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of ergonomic PHIZ cursor mapping.

Figure 20:
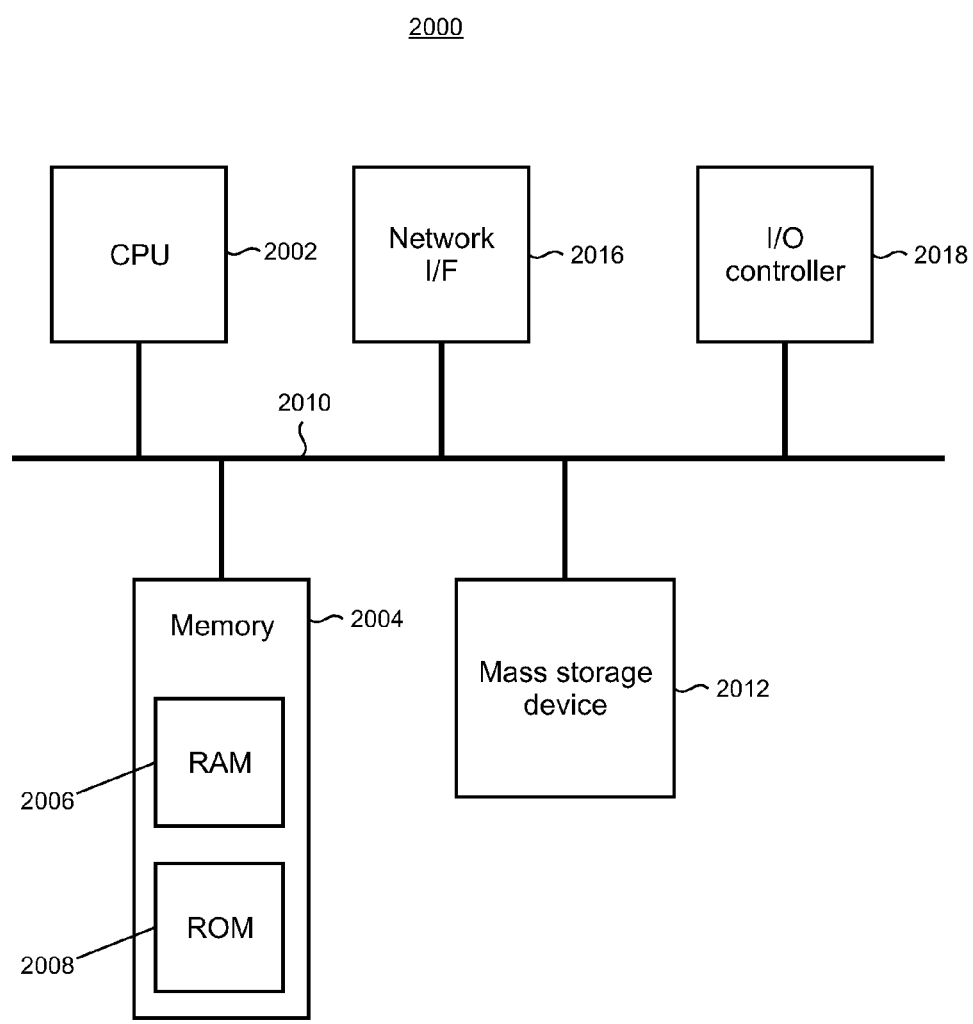
FIG. 20 shows a block diagram of an illustrative computing platform that may be used in part to implement the present ergonomic PHIZ cursor mapping.

It may be desirable and/or advantageous to enable other types of computing platforms other than the multimedia console 1503 (FIG. 15) to implement the present ergonomic PHIZ cursor mapping in some applications. For example, the methodology may be readily adapted to run on fixed computing platforms and mobile computing platforms that have motion and/or video capture capabilities. FIG. 20 shows an illustrative architecture 2000 for a computing platform or device capable of executing the various components described herein for providing ergonomic PHIZ cursor mapping. Thus, the architecture 2000 illustrated in FIG. 20 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 2000 may be utilized to execute any aspect of the components presented herein.

The architecture 2000 illustrated in FIG. 20 includes a CPU 2002, a system memory 2004, including a RAM 2006 and a ROM 2008, and a system bus 2010 that couples the memory 2004 to the CPU 2002. A basic input/output system containing the basic routines that help to transfer information between elements within the architecture 2000, such as during startup, is stored in the ROM 2008. The architecture 2000 further includes a mass storage device 2012 for storing software code or other computer-executed code that is utilized to implement applications, the file system, and the operating system.

The mass storage device 2012 is connected to the CPU 2002 through a mass storage controller (not shown) connected to the bus 2010. The mass storage device 2012 and its associated computer-readable storage media provide non-volatile storage for the architecture 2000. Although the description of computer-readable storage media contained herein refers to a mass storage device, such as a hard disk or CD-ROM drive, it should be appreciated by those skilled in the art that computer-readable media can be any available computer storage media that can be accessed by the architecture 2000.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2000.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It should be appreciated that the network interface unit 2016 also may be utilized to connect to other types of networks and remote computer systems. The architecture 2000 also may include an input/output controller 2018 for receiving and processing input from a number of other devices, including a keyboard, mouse, or electronic stylus (not shown in FIG. 20). Similarly, the input/output controller 2018 may provide output to a display screen, a printer, or other type of output device (also not shown in FIG. 20).

It should be appreciated that the software components described herein may, when loaded into the CPU 2002 and executed, transform the CPU 2002 and the overall architecture 2000 from a general-purpose computing system into a special-purpose computing system customized to facilitate the functionality presented herein. The CPU 2002 may be constructed from any number of transistors or other discrete circuit elements, which may individually or collectively assume any number of states. More specifically, the CPU 2002 may operate as a finite-state machine, in response to executable instructions contained within the software modules disclosed herein. These computer-executable instructions may transform the CPU 2002 by specifying how the CPU 2002 transitions between states, thereby transforming the transistors or other discrete hardware elements constituting the CPU 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2000 in order to store and execute the software components presented herein. It also should be appreciated that the architecture 2000 may include other types of computing devices, including hand-held computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Based on the foregoing, it should be appreciated that technologies for providing and using ergonomic PHIZ cursor mapping have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A computer-implemented method for moving a cursor on a two-dimensional ("2D") display in response to motion of a user's hand, the method comprising the steps of:
    capturing locations of the user's hand within a monitored physical interaction zone ("PHIZ"), the PHIZ being ergonomically matched to the user's natural range of motions;
    tracking the locations within the PHIZ to determine motion of the user's hand; and
    mapping the tracked hand locations from the PHIZ to the display so that motion of the hand in the PHIZ results in a corresponding motion of the cursor on the display.

2. The computer-implemented method of claim 1 further including a step of generating a plurality of tuning parameters, the tuning parameters enabling a size, shape, or location of the PHIZ to be tuned to a given configuration of the user within an area of captured motion.

3. The computer-implemented method of claim 2 in which the configuration of the user is one of standing, seated, lying down, having unconstrained whole arm motion, having constrained whole arm motion, having constrained forearm motion, or having constrained wrist motion.

4. The computer-implemented method of claim 2 in which the tuning parameters include at least one of adjustment for horizontal centering of the PHIZ relative to the user, adjustment of vertical centering of the PHIZ relative to the user, adjustment for horizontal reach of the user within the PHIZ, adjustment for vertical reach of the user within the PHIZ, adjustment of the user's reach when at a middle location within a vertical dimension of the PHIZ, adjustment of a backplane of the PHIZ, or adjustment of a forward plane of the PHIZ.

5. The computer-implemented method of claim 2 further including a step of dynamically adjusting the tuning parameters based on context.

6. The computer-implemented method of claim 5 in which the context includes one of system context or application context, the application context including at least one of a quantity, type, or position of user-accessible controls displayed on a user interface ("UI"), aspect ratio, supported area of cursor movement within the UI, or application behavior in response to user input.

7. The computer-implemented method of claim 1 further including a step of utilizing a whole arm PHIZ in which motion of the user's hand is determined relative to a shoulder joint of the user.

8. The computer-implemented method of claim 1 further including a step of utilizing a forearm PHIZ in which motion of the user's hand is determined relative to an elbow joint of the user.

9. The computer-implemented method of claim 1 further including a step of utilizing a hand PHIZ in which motion of the user's hand or fingers is determined relative to a wrist joint of the user.

10. The computer-implemented method of claim 1 further including the steps of detecting hand motion in a z direction in the PHIZ and utilizing the detected motion as an indication of a press gesture.

11. The computer-implemented method of claim 1 further including a step of dynamically selecting among a plurality of PHIZs, each PHIZ in the plurality being shaped for tracking ergonomic motion of the user's hand about a different arm joint, the arm joint comprising one of shoulder, elbow, or wrist.

12. The computer-implemented method of claim 11 further including a step of transitioning from hand motion data from one PHIZ in the plurality to hand motion data from another PHIZ in either a discrete or a continuous manner.

13. The computer-implemented method of claim 11 further including the steps of obtaining data describing hand motion from two or more of the PHIZs in the plurality and weighting the obtained data to determine a final cursor position on the display.

14. The computer-implemented method of claim 13 in which the weighting comprises observing changes in hand position in each of x and y directions over a time interval to determine a normalized PHIZ velocity for each PHIZ in the plurality and giving greater weight to a PHIZ having a higher velocity.

15. The computer-implemented method of claim 13 further including a step of applying average and jerk filtering to the obtained data.

16. One or more computer-readable storage media storing instructions which, when executed on one or more processors disposed in a computing device perform a method for controlling a movement of a cursor on a user interface ("UI"), the method comprising the steps of:

using an optical sensor to detect a position of a hand or fingers of a subject within one or more of a plurality of three-dimensional ("3D") physical interaction zones ("PHIZs") located in a real world space, each PHIZ being shaped, sized, and located relative to the subject to enable ergonomic motion of the subject's hand or fingers throughout the PHIZ's volume;

dynamically selecting one of the plurality of PHIZs, each PHIZ in the plurality being shaped, sized, and located relative to the subject for tracking ergonomic motion of the subject's hand or fingers about different arm joints, the arm joints comprising one of shoulder, elbow, or wrist;

dynamically applying tuning parameters to the selected PHIZ to adjust at least one of shape of the PHIZ, size of the PHIZ, or location of the PHIZ relative to the subject, the dynamic application being dependent on one of the subject's position in the space, orientation in the space, distance from the optical sensor, past behavior, or UI context;

mapping the detected hand or finger position to a cursor location in a user interface ("UI") supported by a two-dimensional ("2D") display; and moving the cursor in the UI in correspondence with the subject's hand or finger motion within the selected PHIZ.

17. The one or more computer-readable storage media of claim 16 in which the method further includes a step of calibrating the space by observing the subject performing a press at a given location on the UI, the press being performed by motion of the subject's hand or finger in a z direction within the selected PHIZ.

18. The one or more computer-readable storage media of claim 16 in which the method further includes the steps of utilizing one of the PHIZs in the plurality for coarse cursor motion in the UI and utilizing another one of the PHIZs for fine cursor motion in the UI.

19. A system for mapping motion of a user's hand in a three-dimensional ("3D") space to motion of a cursor in a two-dimensional ("2D") display, comprising:

at least one processor;

an optical sensor for capturing an orientation of the user within a physical space and for capturing locations of the user's hand within a 3D physical interaction zone ("PHIZ") that is configured so that the user is able to move the hand to reach all points within the PHIZ in an ergonomic manner; and memory bearing executable instructions that, when executed by the at least one processor, perform a method comprising the steps of:

using the optical sensor, determining the location of the hand within the PHIZ relative to a known point on the user's body using a 3D coordinate system, mapping the hand location in 3D coordinates in the PHIZ to 2D coordinates associated with the cursor in the display, and repeating the determining and mapping steps to move the cursor in the display to correspond with motion of the user's hand.

20. The system of claim 19 in which the method further includes a step of determining motion of the user's hand in a z direction in the PHIZ to enable interaction with a user interface ("UI") on the display, the interacting including one of pressing, zooming, 3D manipulation, or input to the UI.

* * * * *